UNITED STATES PATENT OFFICE 2,504,477

HALOETHYL AMIDES OF ALKOXYACETIC ACIDS AND PREPARATION THEREOF

Karl H. Weber and Lowell B. Kilgore, Washington, D. C.

No Drawing. Application July 9, 1946, Serial No. 682,288

12 Claims. (Cl. 260—561)

This invention relates to new organic compounds, more particularly to a new class of amides and specifically to N-substituted α-etherified acetamides and methods for their preparation.

It is an object of this invention to provide new and useful compounds of the general formula:

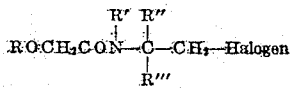

wherein R is a radical selected from the group consisting of hydrocarbon and R''''—(O—A)n— wherein R'''' is hydrocarbon, A is divalent alkylene and n is a small whole number; R' is a radical selected from the group consisting of hydrocarbon and alkyl; R'' is a radical selected from hydrogen, alkyl and halogenated alkyl; and R''' is a radical selected from the group consisting of hydrogen and alkyl. A further object of this invention is to provide processes for the preparation of these compounds. Still a further object is the preparation of new compositions of matter which are useful for combating insects. These and other objects will be apparent from the following more detailed description.

The new compounds of this invention are prepared by reacting an α-etherified acetyl halide of the type:

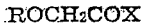

wherein R is a radical selected from the group consisting of hydrocarbon and R''''—(O—A)n— wherein R'''' is hydrocarbon, A is divalent alkylene and n is a small whole number, with a primary amine hydrochloride of the type:

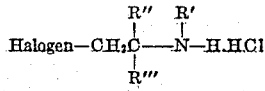

wherein R' is a radical selected from the group consisting of hydrogen and alkyl; R'' is a radical selected from hydrogen, alkyl and halogenated alkyl and R''' is a radical selected from the group consisting of hydrogen and halogenated alkyl. An inert diluent such as dry benzene or toluene is generally used. The mixture is heated under reflux until the reaction is complete. Then it is washed and the compound desired is obtained by fractional distillation under reduced pressure.

The more detailed practice of our invention is illustrated by the following examples which, however, do not limit the scope of the invention in any way.

EXAMPLE 1

N-1-ethyl-2-chloroethyl butoxyacetamide 1-ethyl-2-chloroethyl amine hydrochloride was prepared by treating 17.8 grams of 2-amino-1-butanol covered with 100 cc. of dry benzene with 7.3 grams of dry HCl and then adding 24 grams of thionyl chloride portion-wise. The mixture was warmed to 50° C. for an hour and then the benzene and excess thionyl chloride were removed. The desired amine hydrochloride remained as a residue. To this was added butoxyacetyl chloride prepared by refluxing 26.5 grams of butoxyacetic acid with 24 grams of thionyl chloride and 50 cc. of benzene for an hour. The amine hydrochloride and acid chloride mixture was heated for 6 hours, then cooled, washed with water and sodium bicarbonate solution and distilled under reduced pressure. 44 grams of N-1-ethyl-2-chloroethyl butoxyacetamide, boiling at 107.5–109.5° C./1 mm., were obtained.

EXAMPLE 2

N-1,1-di-(chloromethyl)-ethyl butoxyacetamide 1,1-di-(chloromethyl)-ethyl amine hydrochloride was prepared by treating 10.5 grams of 2-amino-2-methyl-1,3-propanediol covered with 100 cc. of benzene with dry HCl and then adding 16 cc. of thionyl chloride. The mixture was warmed at 55–60° C. for 24 hours and then refluxed for 12 hours. The solvent and excess thionyl chloride were distilled off. To the resulting 1,1-di-(chloromethyl)-ethyl amine hydrochloride, which remained as a residue, was added butoxyacetyl chloride which was prepared by refluxing together 19.8 grams of butoxyacetic acid, 12 cc. of thionyl chloride and 50 cc. of benzene. The amine hydrochloride and acid chloride mixture was refluxed for 36 hours, cooled, washed with water and sodium bicarbonate solution and distilled under reduced pressure. 7.5 grams of N-1,1-di(chloromethyl)-ethyl butoxyacetamide, boiling at 120–130° C./1 mm., were obtained.

EXAMPLE 3

N-butyl-N-2chloroethyl β-butoxyethoxyacetamide

Butoxyethoxyacetyl chloride was prepared by treating 14 grams of butoxyethoxyacetic acid with 25 cc. of thionyl chloride and refluxing gently for one hour. The excess thionyl chloride was then removed by distillation. To the resulting butoxyethoxyacetyl chloride were added 14 grams of butyl-2-chloroethyl amine hydrochloride and 25 cc. of dry benzene. The mixture was refluxed for 16 hours, cooled, washed with water and sodium bicarbonate solution and distilled under reduced pressure. 8 grams of N-butyl-N-2-chloroethyl butoxyethoxyacetamide, boiling at 140–145° C./1 mm., were obtained.

EXAMPLE 4

N-2-chloroethyl cyclohexoxy acetamide

Cyclohexoxyacetyl chloride was prepared by gently refluxing 12.6 grams of cyclohexoxyacetic acid with 50 cc. of toluene and 10 cc. of thionyl chloride for 2 hours. The excess thionyl chloride was distilled off. To the resulting acid chloride were added 9.3 grams of 2-chloroethyl amine hydrochloride and 25 cc. of dry benzene. The mixture was refluxed for 15 hours, cooled, washed with water and sodium bicarbonate solution and the solvent removed by distillation. The residue was subjected to distillation at a pressure of 1 mm. and yielded 10.5 grams of distillate which was then dissolved in a minimum of low boiling petroleum ether. A few drops of benzene were added to the warm petroleum ether solution which was then chilled. 4 grams of N-2-chloroethyl cyclohexoxyacetamide in the form of white needles melting at 76–77° C. were obtained.

EXAMPLE 5

N-2-chloroethyl benzoxyacetamide

Benzoxyacetyl chloride was prepared by refluxing 16 grams of benzoxyacetic acid with 10 cc. of thionyl chloride and 50 cc. of toluene for two hours. The excess thionyl chloride was removed by distillation. To the resulting benzoxyacetyl chloride were added 10.5 grams of 2-chloroethyl amine hydrochloride and 25 cc. of dry benzene. The mixture was refluxed for ten hours, cooled, washed with water and sodium bicarbonate solution and the solvent removed by distillation. The residue was subjected to distillation at a pressure of 1 mm. and yielded 11 grams of distillate which was then dissolved in a minimum of low boiling petroleum ether. A few drops of benzene were added to the warm petroleum ether solution which was then chilled. 6 grams of N-2-chloroethyl benzoxyacetamide in the form of white, needle-like crystals melting at 44–45° C. were obtained.

We have prepared other members of this new series of compounds by means of the aforedescribed methods as follows:

N-2-chloroethyl butoxyacetamide
N-2-chloroethyl butoxyethoxyacetamide
N-2-chloroethyl benzoxyethoxyacetamide
N-butyl-N-2-chloroethyl ethoxyacetamide
N-butyl-N-2-chloroethyl amoxyacetamide
N-octyl-N-2-chloroethyl butoxyacetamide
N-butyl-N - 2 - chloroethyl phenoxyacetamide
N-2-chloroethyl lauroxyacetamide We have discovered that these new compounds of our invention possess insect combative properties to a high degree. They are especially effective as insectifuges. Indeed for certain purposes they may be employed in concentrations as low as 5 percent.

Table I demonstrates the efficacy of representative members of this new series of organic compounds against the common housefly, *Musca domestica*. The test procedure used was the "sandwich bait" method substantially as described in Soap, June 1939, p. 103 ff. A coating of molasses was applied to one side of a strip of blotting paper and dried to hard glossy surface. The molasses was then covered with a strip of a special thin, porous paper which had previously been immersed in a 5 percent solution in alcohol of the compound to be tested and then dried until the alcohol had evaporated. For purposes of comparison one strip was treated only with solvent and dried. The strips prepared in this fashion were mounted on a board and introduced into a large cage containing more than 2000 hungry houseflies. By making observations at frequent intervals the duration of repellency, that is the length of time which elapsed before the flies began to feed on the molasses through the treated tissues, was determined.

Table I

| Compound* | Duration of Repellency to Houseflies |
|---|---|
| N-1-Ethyl-2-chloroethyl butoxyacetamide | 2 hrs. 50 min. |
| N-1, 1-Di-(chloromethyl)-ethyl butoxyacetamide. | 3 hrs. 25 min. |
| N-2-Chloroethyl butoxyethoxyacetamide | 5 hrs. 25 min. |
| N-Butyl-N-2-Chloroethyl ethoxyacetamide | 4 hrs. 25 min. |
| N-Octyl-N-2-chloroethyl butoxyacetamide | 4 hrs. |
| N-Butyl-N-2-chloroethyl butoxyethoxyacetamide. | 9 hrs. 25 min.†[1] |
| N-Butyl-N-2-chloroethyl amoxyacetamide | 13 hrs. 10 min.† |

*Tested in 5 percent concentration.
†Bait still untouched at end of this period. Flies had to be fed at this point.
[1] Bait treated with this compound continuously exposed to flies until it was attacked on the third day. Flies fed a minimum at 24 hour intervals to maintain the colony.

Our new compounds possess marked repellency, not only against flies but against a variety of other annoying pests such as mosquitoes.

One cc. of the compound to be tested was applied to the forearm of an individual and the arm exposed in a cage containing several thousand hungry *Aedes aegypti* mosquitoes for 5 minute periods starting 15 minutes after application and thereafter at 30 minute intervals. The duration of repellency is the length of time which elapsed until the first bite. The following are the results obtained with representative members of our new compounds.

Table II

| Compound | Duration of Repellency |
|---|---|
| | *Minutes* |
| N-2-Chloroethyl butoxyacetamide | 385 |
| N-1-Ethyl-2-chloroethyl butoxyacetamide | 305 |
| N-2-Chloroethyl butoxyethoxyacetamide | [1] 260 |

[1] Test terminated before first bite.

In addition to their insect repellent properties our new compounds possess insecticidal activity in the form of paralytic action as evidenced by the following results obtained by means of the Peet-Grady technique. The solutions were made up in a deodorized kerosene base. The test insect was the common housefly, *Musca domestica*.

Table III

| Compound | Concentration, per cent by weight | Per cent Knockdown in 10 min. | Per cent Kill after 24 hours |
|---|---|---|---|
| N-2-Chloroethyl butoxethoxyacetamide | 5 | 71 | 25 |
| N-Butyl-N-2-chloroethyl ethoxyacetamide | 5 | 72 | 8 |
| N-Butyl-N-2-chloroethyl butoxyethoxyacetamide | 5 | 51 | 3 |
| N-Butyl-N-2-chloroethyl amoxyacetamide | 5 | 61 | 12 |

Our new compounds may be employed in a variety of ways depending on the particular use and the desired mode of application. They may be applied by direct topical application or they may be incorporated into liquid or solid carriers. They may be dissolved in liquid diluents such as alcohol, aqueous alcohol, isopropanol, dimethyl phthalate and hydrocarbon oils such as kerosene, or emulsified in water, if necessary with the aid of a suitable dispersing agent such as sulfonated soybean oil. For some purposes it may be desirable to admix them with finely divided carriers such as diatomaceous earth, talc, pyrophylite, bentonite, etc. They may also be combined with other insecticidal materials such as pyrethrum, rotenenone, derris, cube, DDT and the like.

Although this invention has been described with reference to illustrative embodiments thereof, it will be apparent to those skilled in the art that the principles of this invention may be embodied in other forms but within the scope of the appended claims.

We claim:

1. The N-substituted amides having the general formula:

Alkyl—O—(A—O)$_n$—CH$_2$CONHCH$_2$CH$_2$—Halogen wherein A is divalent alkylene and $n$ is a number, selected from 0 and 1.

2. The N-substituted amides having the general formula:

3. The N-substituted amides having the general formula:

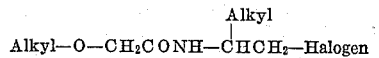

4. N-butyl-N-2-chloroethyl butoxyethoxyacetamide.

5. N-2-chloroethyl butoxyacetamide.

6. N-1-ethyl-2-chloroethyl butoxyacetamide.

7. The process of preparing N-substituted amides which comprises reacting a compound of the general formula:

Alkyl—O—(A—O)$_n$—CH$_2$COX

A is divalent alkylene and $n$ is a number selected from 0 and 1; and X is halogen, with a primary amine hydrochloride of the general formula:

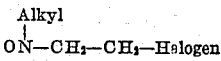

wherein R' is a radical selected from the group consisting of hydrogen and alkyl; R'' is a radical selected from the group consisting of hydrogen, alkyl and halogenated lower alkyl; and R''' is a radical selected from the group consisting of hydrogen and alkyl.

8. The N-substituted amides having the general formula:

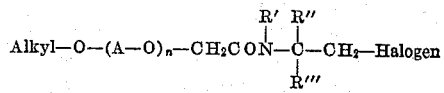

wherein A is divalent alkylene and $n$ is a number selected from 0 and 1; R' is a radical selected from the group consisting of hydrogen and alkyl; R'' is a radical selected from the group consisting of hydrogen, alkyl and halogenated lower alkyl; and R''' is a radical selected from the group consisting of hydrogen and alkyl.

9. The N-substituted amides having the general formula:

wherein A is divalent alkylene and $n$ is a number selected from 0 and 1.

10. The N-substituted amides having the general formula:

Alkyl-OCH$_2$CONHCH$_2$CH$_2$Cl

11. An insect combative composition of matter comprising as essential active ingredient an N-substituted amide having the general formula:

and a carrier therefor.

12. An insect combative composition of matter comprising as essential active ingredient an N-substituted amide having the general formula:

Alkyl-OCH$_2$CONHCH$_2$CH$_2$Cl and a carrier therefor.

KARL H. WEBER.
LOWELL B. KILGORE.

REFERENCES CITED

The following references are of record in the file of this patent:

UNITED STATES PATENTS

| Number | Name | Date |
|---|---|---|
| 2,288,178 | Bestian | June 30, 1942 |
| 2,302,885 | Orthner | Nov. 24, 1942 |
| 2,347,494 | Meigs | Aug. 25, 1944 |
| 2,426,885 | Kilgore | Sept. 2, 1947 |

FOREIGN PATENTS

| Number | Country | Date |
|---|---|---|
| 98,236 | Switzerland | Mar. 5, 1940 |
| 501,004 | Great Britain | Feb. 10, 1939 |
| 784,666 | France | May 6, 1935 |